US012705809B2

(12) United States Patent
King et al.

(10) Patent No.: US 12,705,809 B2
(45) Date of Patent: Aug. 11, 2026

(54) SYSTEM AND METHOD FOR SECURELY OBTAINING INFORMATION USING QR CODES

(71) Applicant: Bank of America Corporation, Charlotte, NC (US)

(72) Inventors: Adam Kristian King, Fort Mill, SC (US); Manil Trivedi, South Riding, VA (US); Camilla Solideo, Chicago, IL (US); Steven Daniel Lawson, Glencoe, IL (US)

(73) Assignee: Bank of America Corporation, Charlotte, NC (US)

(*) Notice: Subject to any disclaimer, the term of this patent is extended or adjusted under 35 U.S.C. 154(b) by 177 days.

(21) Appl. No.: 18/601,784

(22) Filed: Mar. 11, 2024

(65) Prior Publication Data

US 2025/0285345 A1 Sep. 11, 2025

(51) Int. Cl.

| | |
|---|---|
| ***G06T 11/60*** | (2026.01) |
| ***G06F 21/53*** | (2013.01) |
| ***G06K 19/06*** | (2006.01) |
| ***G06T 7/00*** | (2017.01) |

(52) U.S. Cl.

CPC .............. *G06T 11/60* (2013.01); *G06F 21/53* (2013.01); *G06K 19/06037* (2013.01); *G06T 7/001* (2013.01); *G06T 2207/20081* (2013.01)

(58) Field of Classification Search

None

See application file for complete search history.

(56) References Cited

U.S. PATENT DOCUMENTS

| | | | | |
|---|---|---|---|---|
| 8,296,477 | B1 | 10/2012 | Polk | |
| 8,464,343 | B1 | 6/2013 | Cidambi et al. | |
| 8,490,861 | B1 * | 7/2013 | Cidambi | G06F 21/51 235/375 |
| 8,984,294 | B2 | 3/2015 | Nagai et al. | |
| 9,262,633 | B1 | 2/2016 | Todeschini et al. | |
| 9,384,379 | B1 | 7/2016 | Koster | |
| 9,449,343 | B2 | 9/2016 | Mayerle et al. | |
| 9,672,355 | B2 | 6/2017 | Titonis et al. | |
| 9,736,149 | B2 | 8/2017 | Bettenburg et al. | |
| 9,946,963 | B2 | 4/2018 | Samara et al. | |
| 10,334,324 | B2 | 6/2019 | Navin et al. | |

(Continued)

FOREIGN PATENT DOCUMENTS

| | | | |
|---|---|---|---|
| CN | 111788594 | A | 10/2020 |
| EP | 3262555 | A1 | 1/2018 |

*Primary Examiner* — Yanna Wu

(57) ABSTRACT

A system includes a memory that stores a training dataset that includes solutions pertaining to determining malicious quick response (QR) codes; and a processor operably coupled to the memory. The processor receives an image of a QR code, and analyze the image of the QR code using the training dataset to determine whether the QR code is malicious. The analysis is based at least in part upon characteristics of the QR code, and the characteristics include one or more of an identity of a source of the QR code, information that is referenced by the QR code, or a geographical location of the QR code. Upon determining that the QR code is malicious, the processor overlays digital content over the image of the QR code which indicates that the QR code is malicious, and updates the training dataset by storing the malicious QR code in the training dataset.

20 Claims, 2 Drawing Sheets

(56) References Cited

U.S. PATENT DOCUMENTS

| | | | | |
|---|---|---|---|---|
| 10,355,860 | B2 | 7/2019 | Chen et al. | |
| 10,678,908 | B2 | 6/2020 | Grobman et al. | |
| 10,831,740 | B2 | 11/2020 | Liu | |
| 11,238,433 | B2 | 2/2022 | Jamkhedkar et al. | |
| 11,575,519 | B1 | 2/2023 | Walsh et al. | |
| 2013/0151590 | A1 | 6/2013 | Feng | |
| 2017/0351909 | A1 | 12/2017 | Kaehler | |
| 2019/0279326 | A1 | 9/2019 | Chen et al. | |
| 2020/0220875 | A1* | 7/2020 | Harguindeguy | H04L 63/101 |
| 2021/0004589 | A1* | 1/2021 | Turkelson | G06V 10/809 |
| 2022/0318384 | A1* | 10/2022 | Hatekar | G06F 21/552 |
| 2023/0319107 | A1* | 10/2023 | Yao | H04L 63/1483 726/1 |

* cited by examiner

SYSTEM AND METHOD FOR SECURELY OBTAINING INFORMATION USING QR CODES

TECHNICAL FIELD

The present disclosure relates generally to improving security in data communication, and more specifically to a system and method for securely obtaining information using QR codes.

BACKGROUND

Users may be required to perform data interactions before receiving desired services or information from service providers. The users receive quick response (QR) codes from the service providers to receive the desired service or information and the users may be required to scan a QR code to receive the desired service or information. Malicious entities circulate fake QR codes to take over and improperly control the interactions between a user and the service providers and/or to gain access to the information on the user's electronic devices. The fake QR codes may be used to direct the user to a malicious website or may be used to install malware on electronic devices of the user and gain unauthorized access to personal information of the users.

SUMMARY

Embodiments of the disclosure are directed to a system and method for restricting access to compromising information that may be accessed using quick response (QR) codes. Specifically, embodiments of the disclosure are directed to restricting access to malicious information that a user may inadvertently access by scanning publicly posted QR codes. When a user scans a QR code, the information referenced (e.g., via a weblink) by the QR code is opened in a quarantined environment (e.g., sandbox environment). Within the quarantined environment, the system tests various elements of the code or website to determine its legitimate or malicious nature. In doing so, the system uses dynamic code analysis to monitor code execution, API calls (e.g., API calls that access data in the user device), memory interactions between the information accessed and the user device, and other interactions that may expose the user to malicious information. The system may use mock data to access the referenced information to determine whether the information is malicious, and thereby the user information is limited from being compromised. The mock data may mimic the actual data that the user may provide to obtain information or services using the QR code. The system may also utilize heuristics to evaluate the actions or tasks performed after scanning the code. This may include tracking patterns of user interface interactions, network requests, and system-level operations to identify deviations from expected behavior.

In certain embodiments, the system also uses artificial intelligence (AI) and machine learning (ML) engine to determine malicious code and learn the different characteristics of the QR code such as the paper it is printed on, the identifying signage around the code, the geographical location of the QR code, and/or the source of the QR code, etc. For instance, certain malicious QR codes may be known to be printed on a certain type of paper, and the system will check for that type of paper. The system will also check for identifying signages (e.g., designs or logos) around the QR code to check if the identifying signages are the correct ones for a known brand, or if the QR code is known to be located in a specific place of business based on the GPS location of the QR code, the system will check if the logo of the business is the correct logo. The system refers to external repositories that include information related to malicious codes determined by others to update the AI/ML engine training dataset with new solutions pertaining to malicious QR codes. The system utilizes a neutralization option that utilizes a digital content (e.g., augmented reality (AR) content) that is overlaid on the QR code that has been determined as malicious when the QR code is scanned by a subsequent user. The system may also utilize the hardware of the mobile device to project IR light (or similar) that can modify the physical QR code itself, for instance, by modifying the ink of the printed QR code such that the QR code is rendered unreadable by subsequent users.

Certain embodiments of this disclosure provide unique solutions to technical problems encountered in securely accessing information or services via publicly posted QR codes. The solutions provide a secure access to the information by first checking whether the referenced information is malicious, and, if malicious, restricting the user's access to the malicious information. In other embodiments, the solutions also flag the QR code as referencing to malicious information so that subsequent users are also restricted from harm caused by accessing malicious information.

In certain embodiments, this disclosure may particularly be integrated into a practical application of a computer system so that legitimate and authentic information is accessed by a user via QR codes, thereby improving the security of interactions between a user and providers of information, and the overall security of the computer system.

In one embodiment, a system includes a memory that stores a training dataset that includes solutions pertaining to determining malicious quick response (QR) codes, and a processor operably coupled to the memory and configured to receive an image of a QR code, and analyze the image of the QR code using the training dataset to determine whether the QR code is malicious. The analysis is based at least in part upon characteristics of the QR code. The characteristics include one or more of an identity of a source of the QR code, information that is referenced by the QR code, or a geographical location of the QR code. Upon determining that the QR code is malicious, the processor is further configured to overlay digital content over the image of the QR code. The digital content indicates that the QR code is malicious and is configured to restrict access to information that is referenced by the QR code. The processor is further configured to update the training dataset by storing the malicious QR code in the training dataset.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
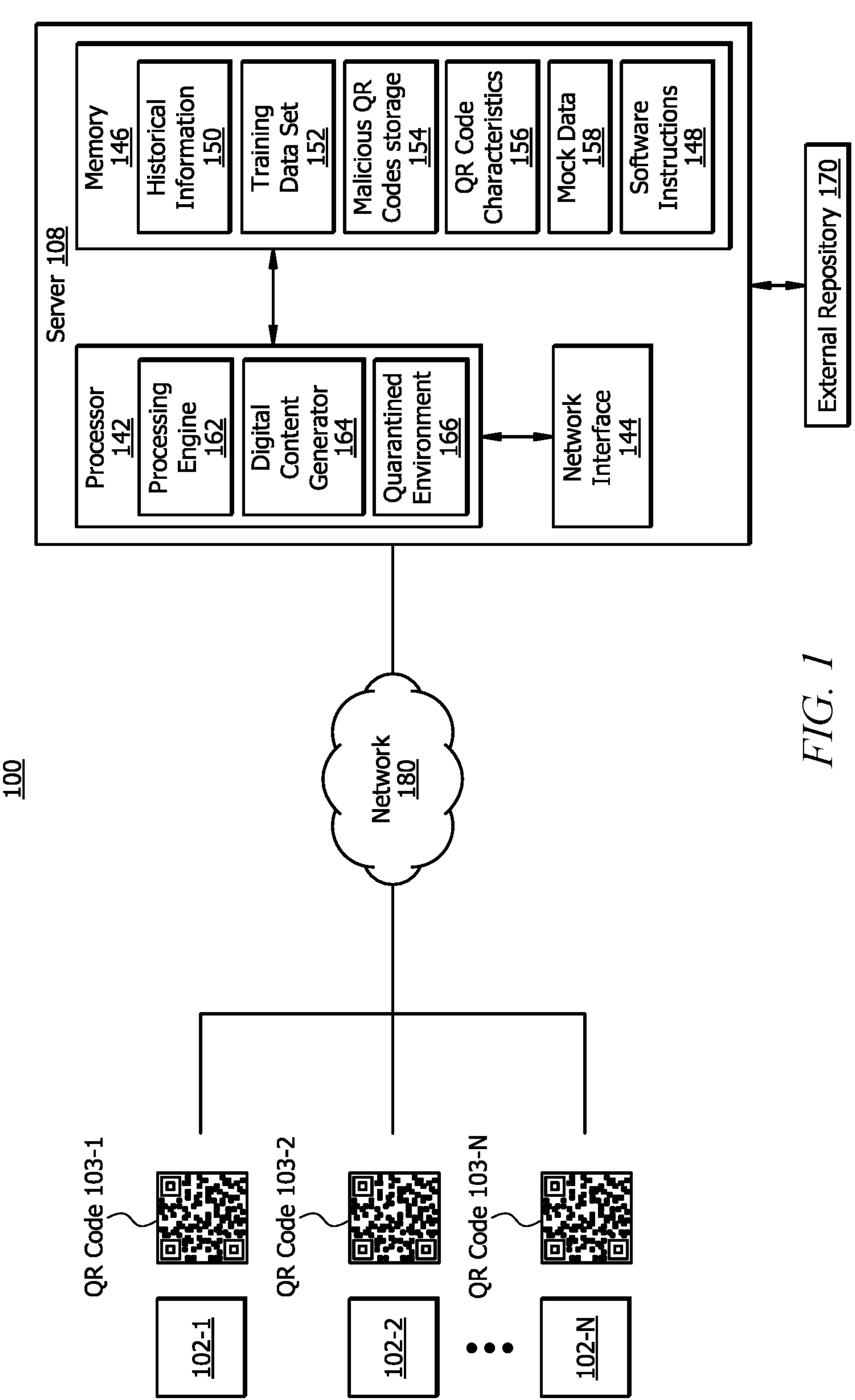
FIG. 1 is a schematic diagram of a system, in accordance with one or more embodiments of the present disclosure.

FIG. 1 is a schematic diagram of a system 100 that includes one or more user devices 102-1, 102-2, . . . , 102-N (collectively, user devices 102) communicatively coupled with a server 108 via a network 180. The network 180 enables the communication among the components of the system 100.

Network

Network 180 may be any suitable type of wireless and/or wired network. The network 180 may be connected to the Internet or public network. The network 180 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 180 may be configured to support any suitable type of communication protocol as would be appreciated by one of ordinary skill in the art.

Example User Device

The user devices 102 may be generally any electronic device that is configured to image QR codes 103-1, 103-2, . . . , 103-N (collectively QR codes 103). Examples of the user devices 102 include but are not limited to, any electronic device that has image capturing capabilities (e.g., camera) such as a personal computer, a desktop computer, a laptop, a tablet computer, a mobile phone (such as a smartphone), smart glasses, or any other suitable type of device. The user device 102 may include a user interface, such as a display, a microphone, a camera, a keypad, or other appropriate terminal equipment usable by a user. The user devices 102 may include a hardware processor, memory, and/or circuitry configured to perform any of the functions or actions of the user devices 102.

Each user device 102 may be configured to take an image of a QR code 103 that the user desires to access the information referenced by the QR code 103. The user device 102 may then transmit the image of the QR code 103 to the server 108 via the network 180 to determine whether the information referenced by the QR code 103 is malicious or unauthentic.

Server

Server 108 may include one or more hardware computer systems, such as virtual machines. For example, the server 108 may be implemented by a plurality of computing devices using distributed computing and/or cloud computing systems in a network. In some embodiments, the server 108 may be a server in a server farm. The server 108 may be an instance of one or more servers 108. In certain embodiments, the server 108 may be configured to provide services and resources (e.g., data and/or hardware resources) to the components of the system 100.

The server 108 comprises a processor 142 operably coupled with a network interface 144 and a memory 146. Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and stores the results of ALU operations. The processor 142 may further include a control unit that fetches instructions from memory and executes them by directing the coordinated operations of the ALU, registers and other components. The one or more processors are configured to implement various software instructions. For example, the one or more processors are configured to execute instructions (e.g., software instructions 148) to perform the operations of the server 108 described herein. In this way, processor 142 may be a special-purpose computer designed to implement the functions disclosed herein. In an embodiment, the processor 142 is implemented using logic units, FPGAs, ASICS, DSPs, or any other suitable hardware. The processor 142 is configured to perform one or more operations of the example method 200 described in FIG. 2, and other tasks described herein.

The processor 142 may be programmed with a processing engine 162 that may be used to determine whether information accessed using a QR code 103 is malicious. In some embodiments, the processing engine 162 may be an artificial intelligence or machine language-based engine incorporates a learning mechanism that captures insights each time an imaged QR code is analyzed to determine whether it is malicious. The processing engine 162 is configured to understand patterns of malicious behavior, emerging threats, effective remediation strategies, and other related mechanisms for identifying malicious information. The processor 142 may also be programmed with a digital content generator 164 to create, for example, an augmented reality (AR) experience for the user. When the QR code is determined to be malicious or unauthentic, the digital content is overlaid on the imaged QR code to indicate the same to the user. The processor 142 may also include a quarantined environment 166 (e.g., a sandbox environment) for analyzing the imaged QR code 103 to determine the malicious nature of the information referenced by the QR code 103. The quarantined environment 166 limits exposure of the user device 102 and the information contained therein to harmful or destructive functions of the malicious information that is referenced by the QR code 103.

The system 100 also accesses one or more external repositories 170 that include information from other external sources about other malicious QR codes, malicious information obtained from the malicious QR codes. The information in the external repositories 170 may be used to update the training dataset 152, the historical information 150, and malicious QR codes storage 154.

Network interface 144 is configured to enable wired and/or wireless communications. The network interface 144 may be configured to communicate data between the server 108 and other devices, systems, or domains of the system 100. For example, the network interface 144 may comprise a near field communication (NFC) interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1 and 2 along with any other data, instructions, logic, rules, or code operable to implement the function(s) described herein when executed by processor 142. For example, the memory 146 is operable to store software instructions 148, historical information 150, a training dataset 152, malicious QR codes storage 154, QR code characteristics 156, mock data 158, and/or any other data or instructions. The software instructions 148 may comprise any suitable set of instructions, logic, rules, or code operable to execute the processor 142 and perform the functions described herein, such as some or all of those described in FIGS. 1 and 2.

In some embodiments, the training dataset 152 may include a set of data patterns (or other criteria) for determining malicious quick response (QR) codes and solution instructions to take necessary actions when malicious code has been determined. In some embodiments, the system 100 detects data patterns in the information accessed via a QR code 103, and compares the detected data patterns with a data pattern that is stored the historical information 150 and considered as malicious. When determined to be malicious, the training dataset 152 provides a solution instruction that provides action(s) to be taken to restrict access to the malicious information. In some embodiments, the solution instructions may include informing the user of the user device 102 that the QR code being imaged is a malicious QR code since it references malicious information. In other embodiments, and as discussed below, the solution instructions may include overlaying the malicious QR code image with digital content using the digital content generator 164 to create an augmented reality experience that informs that user that the QR code is malicious.

In some embodiments, previously determined malicious QR codes are stored in the malicious QR codes the malicious QR codes storage 154 in the memory 146. When a user images a QR code, the QR code is compared with the malicious QR codes stored in the malicious QR codes storage 154 to determine whether the newly imaged QR code is malicious. In some embodiments, determining malicious QR codes may include analyzing the imaged QR code to determine various QR code characteristics 156 stored in the memory 146. These QR code characteristics 156 may include an identity of a source of the QR code 103, information that is referenced by the QR code 103, a geographical location of the QR code 103, a composition of the QR code (e.g., the ink used to print the QR code), a material on which the QR code is printed, identifying signages or designs proximate the QR code, and similar features associated with the QR code 103. The memory 146 also stored mock data 158. Mock data 158 refers to data what mimics actual data that may be used to access information referenced by the QR code. The processor 142 is configured to provide the mock data 158 when accessing information referenced by the imaged QR code 103. Providing the mock data 158 instead of the actual data restricts exposure of sensitive user data and improves security.

In an example operation, a user may scan or capture (image) a QR code 103 using the user device 102. The QR code 103 may be a publicly posted QR code at a place of business or at a point of service. The QR code 103 may be scanned or imaged using the camera of the user device 102. The processor 142 receives the image of the QR code 103 and activates the QR code 103 in the quarantined environment 166. In an embodiment, the quarantined environment 166 may be a sandbox environment, within which every element of the information (e.g., website) referenced by the QR code 103 is analyzed to determine its legitimacy or malicious nature.

The analysis may be performed using dynamic code analysis to monitor QR code execution, API calls (e.g., API calls that access data in the user device), memory interactions between the information accessed and the user device, and other interactions that may expose the user to malicious information. According to embodiments, the code analysis may also include static code analysis that includes analyzing the code structure, embedded links, scripts, and potential vulnerabilities. This involves parsing and inspecting the QR code at rest to uncover security risks before activation. The analyses may enable detection of anomalies or malicious activities that may be performed by the website or other destination referenced by the QR code 103. According to some embodiments, the analysis may also utilize heuristics (e.g., behavioral heuristics) to evaluate the interactions initiated by the QR code 103. This includes tracking patterns of user interface interactions, network requests, and system-level operations to identify deviations from known or expected behavior.

The quarantined environment 166 ensures a secure testing space by isolating the analysis process from the user device 102 and its resources (e.g., hardware and software resources). This may restrict any malicious code from accessing the user device 102, and thereby limit compromise of user data.

In some embodiments, the interactions, such as clicks (e.g., selections) form submissions, data input and similar, in the quarantined environment may utilize mock data. The mock data mimics actual data that a user may provide or the actions that the user may perform on the website (or similar) that is accessed by the QR code 103. This safeguards the user's actual information while allowing to assess the website behavior comprehensively. In some embodiments, mock data generation techniques, such as synthetic data creation or data masking, may be used. This ensures realistic interactions within the quarantined environment without exposing actual user information.

In some embodiments, when analyzing the QR code 103, the processor 142 uses the processing engine 162 and the training dataset 152 to understand patterns of malicious behavior, emerging threats, and effective remediation strategies. The processing engine 162 may include artificial intelligence and machine learning based capabilities to learning of newer, evolving threats and thereby enhance the ability to proactively identify and mitigate future threats.

When the QR code 103 or the referenced website is identified as malicious, the malicious QR code and/or website are cross-referenced against known malicious QR codes and websites that may be obtained from external sources (e.g., stored in one or more external repositories 170), and the sources are updated with new information that is determined. This enhances the accuracy of threat detection by leveraging a constantly updated repository of threat indicators. By incorporating these advanced technical components, a sophisticated defense mechanism may be established against potential threats associated with QR codes, thereby ensuring an improved level of security for users. In addition to providing a robust defense against potential threats associated with QR codes 103, and contributing to a proactive cybersecurity approach, embodiments also improve the efficiency of detection of malicious QR codes, since the updated information in the repositories can be used to quickly identify later instances of the same malicious QR code.

According to some embodiments, when a QR code is determined to be malicious, the system may provide a neutralization option to restrict access to the malicious code. Herein, the system may overlay digital content over the image of the QR code 103 to identify the QR code 103 as being malicious. For instance, the digital content may be or include augmented reality. Thus, after the QR code has been determined as malicious, a user may see an augmented reality (AR) projected to overlay the image of the physical QR code 103. This overlay may effectively mask the QR code and restrict the scanning of the QR code and, thereby restrict access to the information that is referenced by the QR code 103. The system may also provide an interactive UI on the user device 102 that may allow users to engage with the overlay on the user device 102 to report the QR code 103 as malicious. This engagement may create a community-driven approach to QR code security. According to embodiments, blockchain technology may also be used to verify the authenticity of the AR and ensure integrity of the information shared among the users.

In some embodiments, the QR code may be determined to be malicious based on a correlation between the different characteristics of the QR code. For instance, consider a restaurant use case wherein a user scans a posted QR code to access the restaurant menu. When the QR code image is received by the system, a GPS location of the QR code is also obtained. The system then determines from the GPS location the presence of a restaurant in proximity of the QR code location and anticipates that the QR code may reference to the restaurant menu. Thus, the system determines a relatively strong correlation between two characteristics of the QR code, its GPS location, and the information that the QR code supposed to refer. In case the QR code refers to information other than the restaurant menu, it may be determined that the QR code is malicious.

According to embodiments, when a QR code has been determined to be malicious, the user of the user device 102 that has imaged the malicious QR code 103 is informed that the QR code 103 is malicious. For example, the user may be informed via a notification that may be displayed on the display of the user device 102. The user may then be given an option to accept the results (code is malicious) or override the determination.

According to embodiments, it may be determined if the QR code 103 is authentic by verifying if the information referenced by the QR code 103 is from known or approved sources. For instance, considering a store use case, a user scans a QR code posted in a grocery store to place a special order. The QR code opens an ordering menu that lists different items that the user can order. If the items on the list are labelled with the name of the grocery store or from known suppliers to the grocery store, then it may be determined that the QR code is authentic.

According to embodiments, the system may be configured to physically modify a malicious QR code so that the QR code is rendered unreadable. For example, when the QR code is determined to be malicious, the system may control (e.g., via an app on the user device) a light source on the user device 102 to emit light that can change the composition of the ink used to print the QR code such that portions of the QR code are erased or rendered unreadable, and thereby the entire QR code is rendered unreadable. The light may be infrared (IR) light generated from an IR light source on the user device 102.

Figure 2:
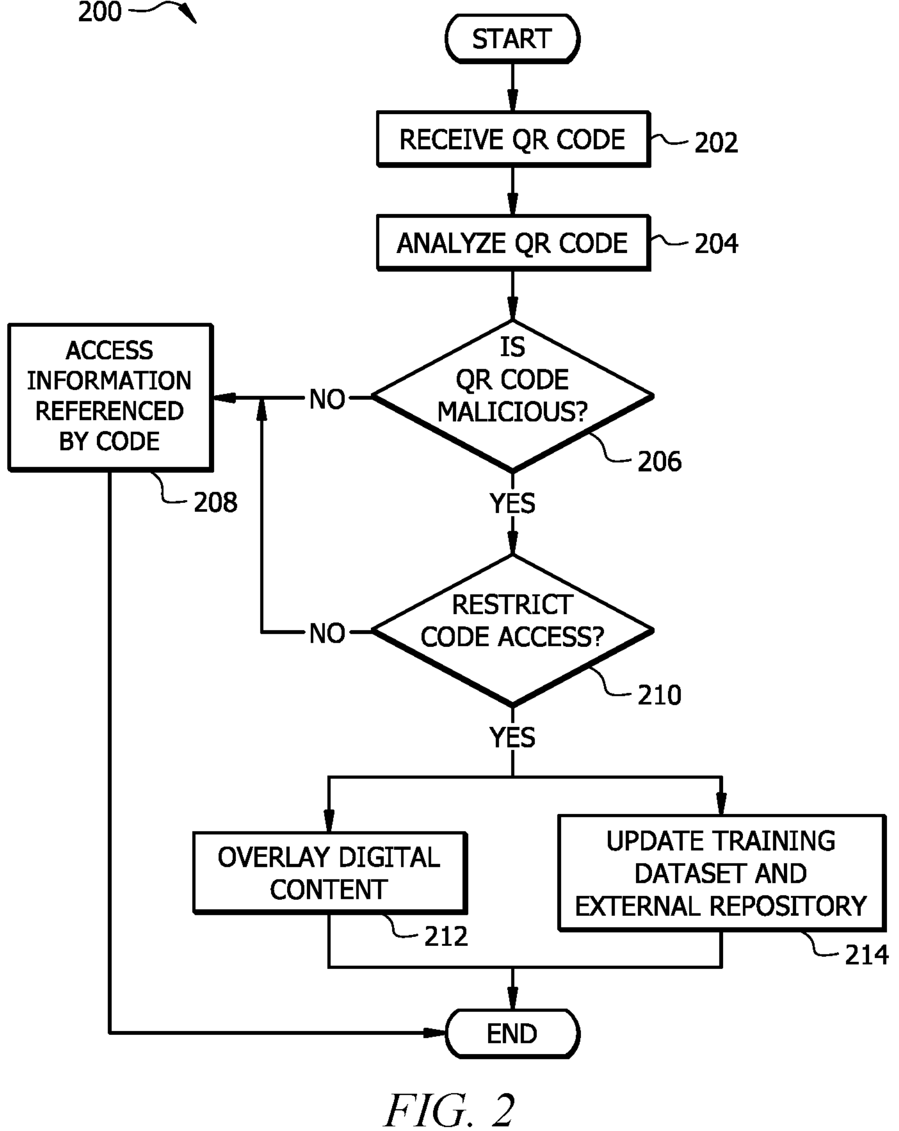
FIG. 2 illustrates a flowchart of an example method for determining malicious QR codes and restricting access to information referenced by the malicious QR codes, in accordance with one or more embodiments of the present disclosure.

FIG. 2 illustrates a flowchart of an example method 200 for determining malicious QR codes and restricting access to information referenced by the malicious QR code, in accordance with one or more embodiments of the present disclosure. The processor 142 is configured to perform one or more operations of the example method 200, and other tasks described herein.

At operation 202, the processor 142 receives an image of a QR code 103. The image of the QR code 103 may be received using a user device 102.

At operation 204, the processor 142 analyzes the QR code 103 to determine whether the QR code 103 is malicious. In analyzing the QR code 103, the processor 142 may use the processing engine 162 and the training dataset 152 to understand patterns of malicious behavior, emerging threats, and effective remediation strategies. The analysis may also consider different characteristics of the QR code 103 including, for example, an identity of the source of the QR code, the information that is referenced by the QR code, a geographical location of the QR code, a composition of the QR code, a material on which the QR code is printed, and identifying signages or designs proximate the QR code. The analysis may be performed in a quarantined environment 166. Within the quarantined environment 166, the system tests every element of the code or website to determine its legitimacy or malicious nature. The quarantined environment 166 limits exposure of the user device 102 and the information contained therein to harmful or destructive functions of the malicious information that is referenced by the QR code 103.

At operation 206, a determination is made, based on the analysis, whether the QR code 103 is malicious. If the QR code 103 is not determined to be malicious, then the information referenced by the QR code 103 is accessed and the method end. If the QR code 103 is determined to be malicious, then the user is prompted for action at operation 210. The user may be prompted to decide whether to continue with restricting access to information referenced by the QR code. If the user decides against restricting access to the information, then the method 200 moves to operation 208. If the user decides to restrict access to the information, then at operation 212, digital content is overlaid over the image of the QR code 103 to mask the QR code rendering it unreadable. The digital content may also indicate that the QR code 103 is malicious. In some embodiments, the processor 142 overlays the digital content over the image of the QR code 103 using augmented reality.

At operation 214, the training dataset is updated by storing the malicious QR code 103 in the training dataset. Additionally, or alternatively, one or more external repositories 170 are also updated with the malicious QR code 103.

While several embodiments have been provided in the present disclosure, the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:

a memory that stores a training dataset that includes solutions pertaining to determining malicious quick response (QR) codes; and a processor operably coupled to the memory and configured to:

receive an image of a QR code;

quarantine the image of the QR code in an quarantined environment;

while the image of the QR code is quarantined in the quarantined environment:

analyze the image of the QR code using the training dataset and mock data to determine whether the QR code is malicious, wherein the analysis is based at least in part upon a correlation between information that is referenced by the QR code, a geographical location of the QR code and proximity to an entity associated with the geographical location of the QR code and wherein the mock data mimics actual data that is used to access information referenced by the QR code;

upon determining that the QR code is malicious, render the image of the QR code unreadable, wherein the rendering the image of the QR code unreadable comprises controlling a light source to emit light that erases a portion of image of the QR code to restrict access to information that is referenced by the QR code; and update the training dataset by storing the QR code determined as malicious in the training dataset.

2. The system of claim 1, wherein the processor is further configured to:

update the training dataset by storing an identity of a source pertaining to the QR code determined as malicious in the training dataset; and monitor one or more external repositories to determine other QR codes as malicious and update the training dataset with new solutions pertaining to determining the other QR codes as malicious.

3. The system of claim 1, wherein the processor overlays a digital content over the image of the QR code using augmented reality.

4. The system of claim 1, wherein the processor is further configured to analyze the image of the QR code based at least in part upon characteristics of the QR code that include a composition of the QR code and a material on which the QR code is printed.

5. The system of claim 1, wherein the processor is further configured to utilize the mock data to access the information referenced by the QR code to determine whether the QR code is malicious.

6. The system of claim 1, wherein, in analyzing the QR code, the processor is further configured to determine whether the image of the QR code is malicious based at least in part upon different characteristics of the QR code.

7. The system of claim 1, wherein the processor is further configured to determine whether the QR code that has been imaged is authentic based at least in part upon whether the information referenced by the QR code is related to known or approved sources.

8. The system of claim 1, wherein the processor is further configured to modify the image of the QR code determined as malicious physically such that the QR code determined as malicious is rendered unreadable.

9. The system of claim 1, wherein the processor is further configured to provide an indication to a user that the QR code has been determined as malicious and to request a confirmation from the user that the QR code is malicious.

10. The system of claim 1, wherein the analysis of the image of the QR code is further based at least in part upon characteristics of the QR code that include identifying signages or designs proximate the QR code.

11. A method, comprising:

storing, in a memory, a training dataset that includes solutions pertaining to determining malicious quick response (QR) codes;

receiving an image of a QR code;

quarantining the image of the QR code in an quarantined environment;

while the image of the QR code is quarantined in the quarantined environment:

analyzing the image of the QR code using the training dataset and mock data to determine whether the QR code is malicious, wherein the analysis is based at least in part upon a correlation between information that is referenced by the QR code, a geographical location of the QR code and proximity to an entity associated with the geographical location of the QR code and wherein the mock data mimics actual data that is used to access information referenced by the QR code;

upon determining that the QR code is malicious, rendering the image of the QR code unreadable, wherein the rendering the image of the QR code unreadable comprises controlling a light source to emit light that erases a portion of image of the QR code to restrict access to information that is referenced by the QR code; and updating the training dataset by storing the QR code determined as malicious in the training dataset.

12. The method of claim 11, wherein the method further comprises:

overlaying a digital content over the image of the QR code using augmented reality.

13. The method of claim 11, wherein the method further comprises:

analyzing the image of the QR code based at least in part upon characteristics of the QR code that include a composition of the QR code and a material on which the QR code is printed; and utilizing the mock data to access the information referenced by the QR code to determine whether the QR code is malicious.

14. The method of claim 11, wherein analyzing the QR code to determine whether the image of the QR code is malicious is based at least in part upon different characteristics of the QR code.

15. The method of claim 11, further comprising:

modifying the image of the QR code determined as malicious physically such that the QR code determined as malicious is rendered unreadable.

16. A non-transitory computer-readable medium storing instructions that when executed by a processor cause the processor to:

store, in a memory, a training dataset that includes solutions pertaining to determining malicious quick response (QR) codes;

receive an image of a QR code;

quarantine the image of the QR code in an quarantined environment;

while the image of the QR code is quarantined in the quarantined environment:

analyze the image of the QR code using the training dataset and mock data to determine whether the QR code is malicious, wherein the analysis is based at least in part upon a correlation between information that is referenced by the QR code, or a geographical location of the QR code and proximity to an entity associated with the geographical location of the QR code and wherein the mock data mimics actual data that is used to access information referenced by the QR code;

upon determining that the QR code is malicious, render the image of the QR code unreadable, wherein the rendering the image of the QR code unreadable comprises controlling a light source to emit light that erases a portion of image of the QR code to restrict access to information that is referenced by the QR code; and update the training dataset by storing the QR code determined as malicious in the training dataset.

17. The non-transitory computer-readable medium of claim 16, wherein the instructions further cause the processor to:

update the training dataset by storing an identity of a source pertaining to the QR code determined as malicious in the training dataset; and monitor one or more external repositories to determine other QR codes as malicious and update the training dataset with new solutions pertaining to determining the other QR codes as malicious.

18. The non-transitory computer-readable medium of claim 16, wherein the instructions further cause the processor to:

analyze the image of the QR code based at least in part upon characteristics of the QR code that include a composition of the QR code and a material on which the QR code is printed; and utilize the mock data to access the information referenced by the QR code to determine whether the QR code is malicious.

19. The non-transitory computer-readable medium of claim 16, wherein the instructions further cause the processor to determine whether the image of the QR code is malicious based at least in part upon different characteristics of the QR code.

20. The non-transitory computer-readable medium of claim 16, wherein the instructions further cause the processor to:

provide an indication to a user that the QR code has been determined as malicious and to request a confirmation from the user that the QR code is malicious.

* * * * *